Nov. 10, 1942. M. J. RENTSCHLER ET AL 2,301,812
METHOD FOR PRODUCING AND USING NON-OXIDIZING GASES
Filed Sept. 26, 1939 4 Sheets-Sheet 1
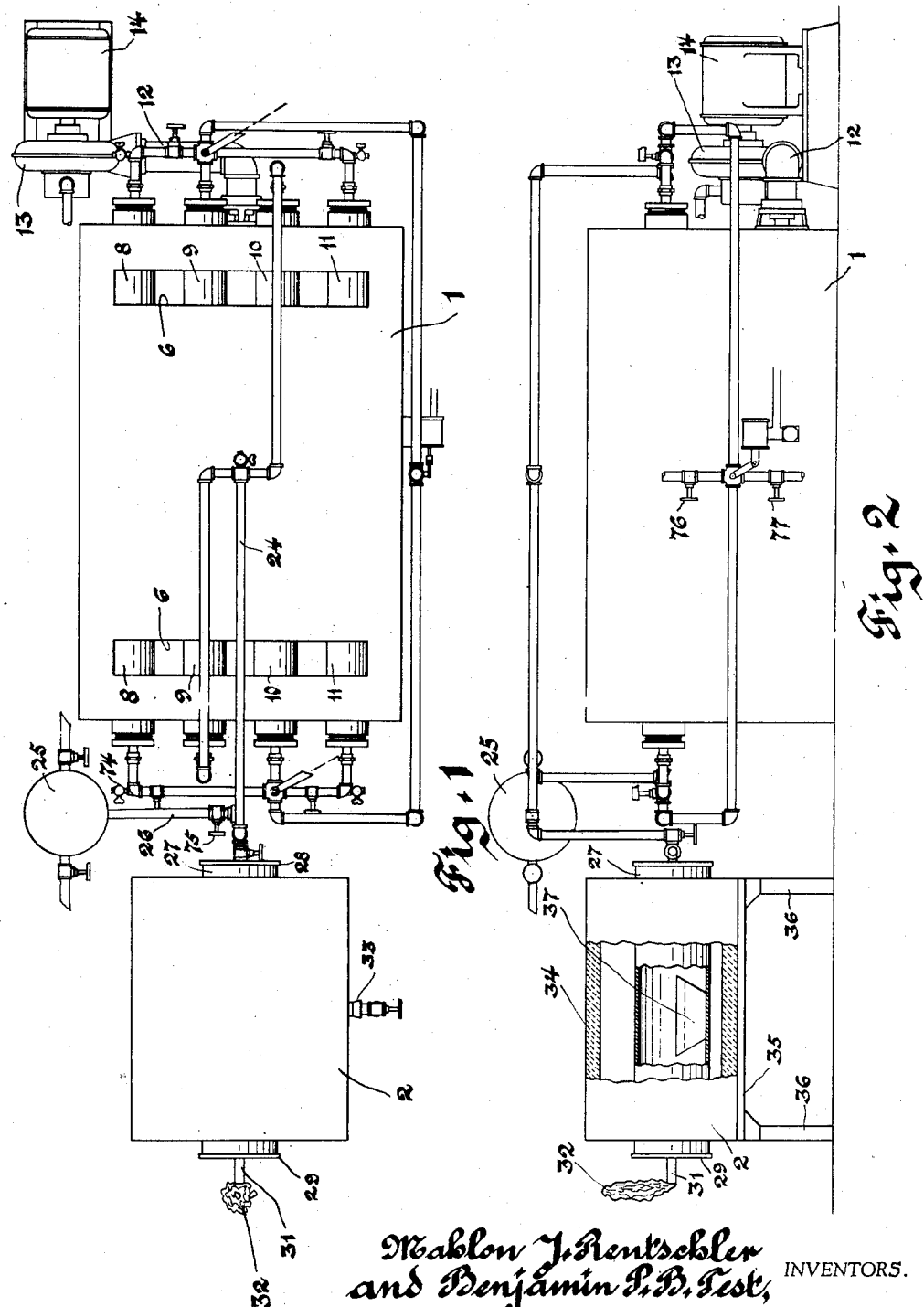
Mahlon J. Rentschler
and Benjamin P. B. Test, INVENTORS.
BY Saywell & Wesseler,
ATTORNEYS.

Nov. 10, 1942.   M. J. RENTSCHLER ET AL   2,301,812
METHOD FOR PRODUCING AND USING NON-OXIDIZING GASES
Filed Sept. 26, 1939   4 Sheets-Sheet 2

Mahlon J. Rentschler
and Benjamin P. D. Test, INVENTORS.
BY Saywell & Wessler,
ATTORNEYS.

Nov. 10, 1942.  M. J. RENTSCHLER ET AL  2,301,812
METHOD FOR PRODUCING AND USING NON-OXIDIZING GASES
Filed Sept. 26, 1939    4 Sheets-Sheet 3
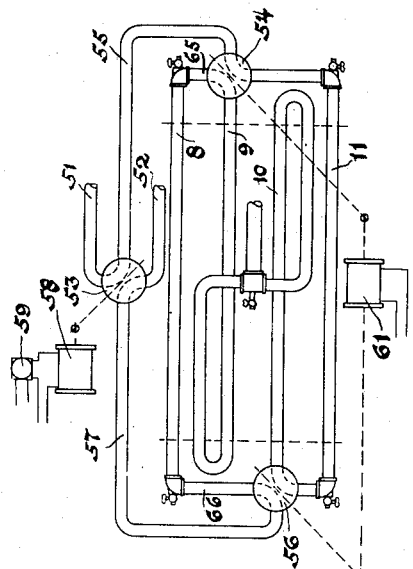
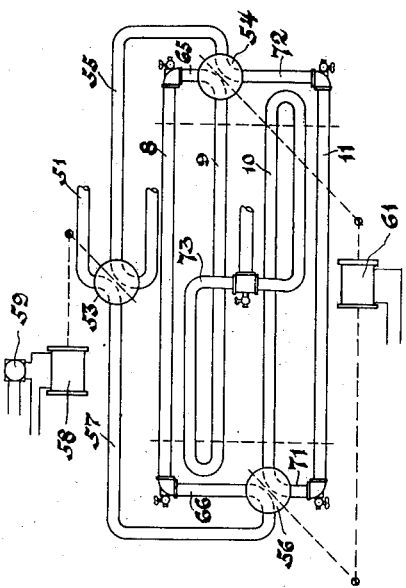
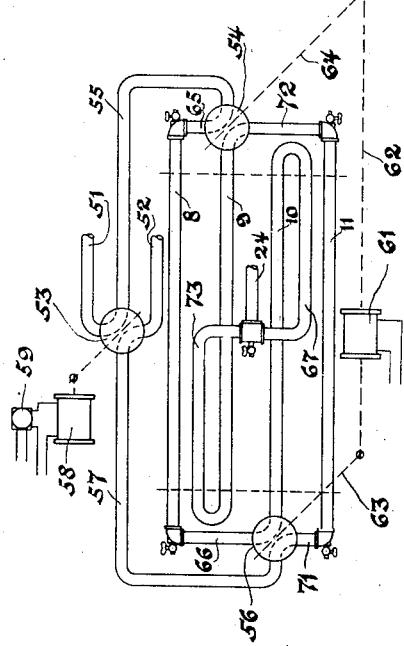
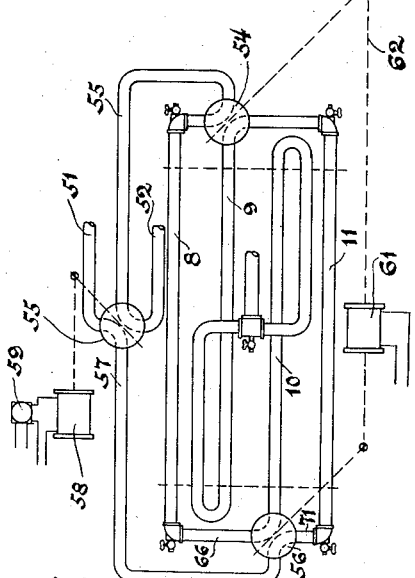
Mahlon J. Rentschler
and Benjamin P. B. Test,
INVENTORS.
BY Saywell & Wesseler,
ATTORNEYS.

Patented Nov. 10, 1942

2,301,812

UNITED STATES PATENT OFFICE 2,301,812

METHOD FOR PRODUCING AND USING NONOXIDIZING GASES

Mahlon J. Rentschler, Willoughby, and Benjamin P. B. Test, Euclid, Ohio, assignors of one-fifth to William J. Wesseler, East Cleveland, Ohio, and one-fifth to William P. Hunsdorf, Lakewood, Ohio Application September 26, 1939, Serial No. 296,540

2 Claims. (Cl. 113—59)

This invention, as indicated, relates to a method for producing non-oxidizing gases for industrial uses. It is particularly adapted for use in metal treatment and the like, such as annealing and bonding operations. It has in view the cracking or dissociation under conditions of high temperature of a hydrocarbon gas supply whereby the greater portion of its carbon content is deposited as pure carbon and thereafter utilizing such deposited carbon in the treatment of an air supply under like conditions of high temperature whereby free oxygen in the air is converted into carbon monoxide and free nitrogen is produced.

The invention utilizes in the cracking of the gas supply and the air supply a non-resinous high temperature coke in suitable sizes for effective action upon the gases brought in contact therewith, and the conservation or economical use of such coke supply, so as to reduce the cost of such operation to a practical economic basis, is of primary importance.

Heretofore in the production of non-oxidizing gases, it has been necessary to employ small units and use extreme care to avoid explosion hazards where the gas used was principally hydrogen. Where the gas used comprised a mixture of other gases, it has been necessary in many instances to install cooling and drying or desiccating chambers to remove all traces of moisture. This in turn has involved the cost of such additional equipment as well as the maintenance and servicing of the same.

In the present invention a single gas production unit is provided, such unit having separate individual passageways for the treatment of the fuel gas supply and the treatment of the air supply, and having means for interchanging the gases in such passageways as well as the direction of flow of such gases through such selective passageways, so as to bring about uniformity of gas production and low cost operation. The process and apparatus has in view the use of non-resinous specially treated high temperature coke within the respective gas passageways of the apparatus and depositing carbon from the hydrocarbon gases passing therethrough upon the surface of such coke, and in a companion chamber taking up a similar deposit of free carbon to convert the air supply passing therethrough into a mixture of carbon monoxide and nitrogen.

The invention includes the combining of each of the gas supplies referred to after treatment as above stated and the utilization of such combined gases in a treatment chamber likewise utilizing high temperature conditions.

The invention also has in view the producing of a bond of a practically indestructible character between ferrous metals and certain coating metals of a non-oxidizing character, such as steel and copper, such bond exhibiting a structure at the point of juncture which has been designated as atomic adhesion, and which exhibits none of the brittleness found in what is known as a hydrogen bond, and which permits the use of all the various fabricating steps of rolling and shaping without separating such bond or causing flaking or cracking of the metals at their point of union.

The apparatus includes features of construction providing for the ready production and control of high temperatures within a furnace chamber and the treatment of a hydrocarbon gas supply and an air supply alternately within separate passageways through such heated chamber. It provides for control both of the type and quantity of gas supply within a selected passageway and the direction in which such gas supply moves through such passageway. It also includes automatic control of such gas selection and direction of flow at predetermined intervals. The apparatus is also provided with suitable means to permit servicing or replacement of the parts without completely shutting down such apparatus.

The principal object of the present invention is to provide a method for supplying low cost non-oxidizing gases for industrial uses.

Another object of the invention is to provide a method for treatment of a hydrocarbon gas supply at high temperature to deposit carbon therefrom as one part of a cycle of operations and for treating an air supply at high temperature to take up such deposited carbon as another part of a cycle of operations, each of such treatments preconditioning the treatment passageways with their contents, for the companion portion of such cycle.

Another object of the invention is to combine the gases produced by the respective treatments mentioned, as a substantially continuous process, and thereafter treating metal surfaces with such combined gases at high temperature to produce a substantially indestructible bond between the metals treated, such bond being described as embodying atomic adhesion.

Another object of the invention is to provide for the conservation and economical use of the non-resinous high temperature coke employed to bring about the reactions in the gas treatments, such coke acting largely in the manner of a catalyst and withstanding high temperature for extended periods.

A further object of the invention is to provide for controlling the quantities of the respective gases in the combined mixture produced in such apparatus as well as controlling automatically the production of such gases within the apparatus after the predetermined quantities and rate of production of such gases are decided upon.

A further object of the invention is to provide for the easy replacement of the coke supply for the gas treatment chambers, and for the replacement of any parts of the apparatus in an emergency without shutting down such gas-producing apparatus as a whole.

Other and further objects of the invention will appear in the course of the following description.

To the accomplishment of the foregoing and related ends, said invention, then, consists of the means and method hereinafter fully described and particularly pointed out in the claims, the annexed drawings and the following description setting forth in detail certain means and methods embodying the invention, such disclosed means and methods constituting, however, but several of various forms in which the principle of the invention may be used.

In said annexed drawings:

Figure 1 is a top plan view of an apparatus embodying the principles of the invention;

Figure 2 is a side elevation of the apparatus shown in Figure 1;

Figures 7, 8, 9 and 10 are diagrammatic views showing the schematic lay-out of the gas passageways of the apparatus illustrated in Figures 1 to 5 inclusive, together with various valve positions and automatic control therefor;

Figure 3:
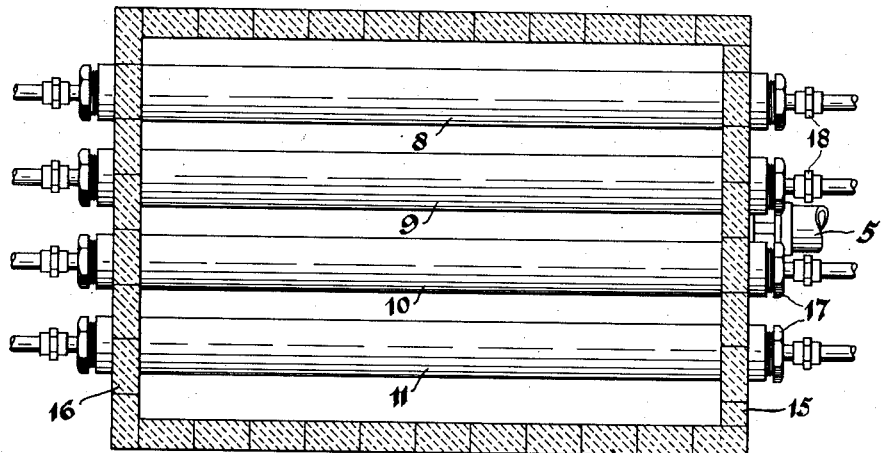
Figure 3 is an enlarged plan view, partly in section, showing the retorts positioned within the heating chamber.

As is clearly shown in Figures 1 and 2 of the drawings, the preferred form of apparatus comprises a gas production unit 1 and a heat treatment unit 2. The gas production unit comprises a conventional type of furnace structure built of or lined with refractory brick 3. The furnace unit provides a large open heating chamber 4 within which gases from a forced draft burner 5 are consumed, the spent gases escaping through suitable flues 6 formed in the top plate 7 of a refractory cover for the heating unit. The furnace is designed to produce a temperature at or above 1832 degrees Fahrenheit to heat material passing through the gas passageways of the heating chamber. Such gas passageways 8, 9, 10, 11 within the heating chamber accordingly are formed of retorts of suitable material to withstand the temperature referred to, the retorts illustrated in the drawings being preferably formed of nickel chromium alloy.

Figure 4:
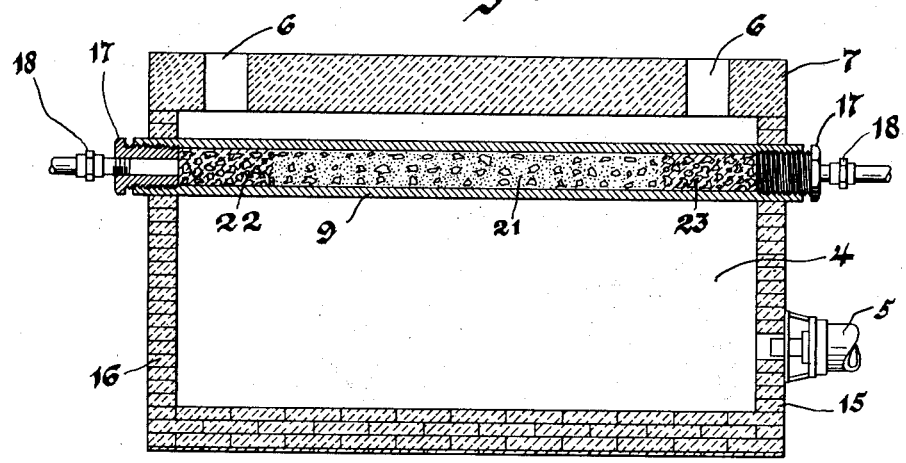
Figure 4 is a central vertical sectional view of the structure shown in Figure 3.
Figure 5:
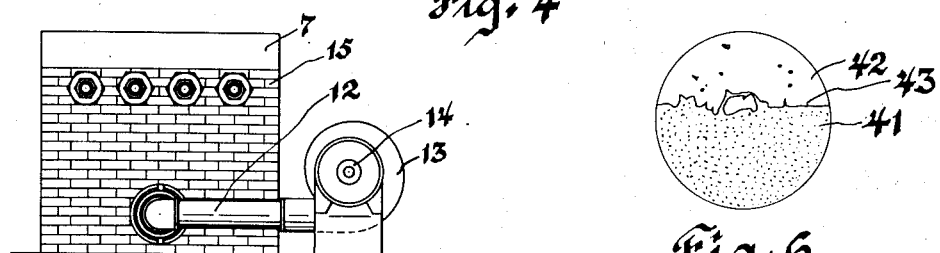
Figure 5 is an end view of the structure shown in Figures 3 and 4, showing in addition the motor and fan for the forced draft burner.

The retorts shown in Figures 1 to 5 of the drawings are four in number and are placed above the flame, but where the retorts are of extremely large size it may be found desirable to position the same adjacent the floor of the furnace chamber so as to provide a certain degree of support for such elements when the higher ranges of temperature are employed. The burner for the heating unit as shown in Figure 5 is supplied by a conduit 12 connected with a fan 13 driven by a motor 14. The ends of the retorts project through the end walls 15, 16 of the heating unit and are closed with end caps 17 which may be the usual standard pipe fittings, such caps having pipe connections provided with unions 18 closely adjacent the same. Any suitable equivalent construction may be employed in lieu of the elements shown, it being necessary, however, at times to remove one or more end caps to replenish the specially treated preconditioned coke 21 placed centrally within each of the retorts intermediate positioning masses of refractory material 22, 23, such as fragments of furnace brick. The unions employed in the pipe connections adjacent each of the retorts permit the substitution of other connections to the pipe lines to isolate one of the retorts and continue the circulation of the gases through its companion retorts without shutting down the apparatus during such period of replacement.

The various pipe connections providing the passageways through which the gases are circulated and recirculated through the gas production unit will be presently described in detail. It should be stated, however, that the connections are such that a fuel gas supply and an air supply may be separately circulated through selected retorts and associated piping with the flow in either direction through the heating chamber, and that the gases when so treated are finally combined in a single conduit 24 delivering such gases to a point of storage or distribution 25 through a branch conduit 26, or to a point of immediate use within the retort 27 provided centrally within the metal treatment chamber 2.

The retort 27, when used for the higher ranges of temperature, may be formed of a nickel chromium alloy similar to the material of the retorts previously described. Suitable end caps 28, 29 are provided for the retort 27, such end caps being made of suitable heat resistant material, and the end cap 29 may be provided with a jet 31 at the free end of which any combustible gases discharged from the apparatus may be consumed in a flame 32.

The heat treatment unit 2 may be provided with its own independent source of heat by means of the forced draft burner 33 shown in Figure 1. The heat treatment unit may comprise a chamber having walls 34 of fire brick or suitable refractory material and the entire structure may be supported by a platform 35 spaced from the floor by means of standards 36 of suitable height.

Figure 6:
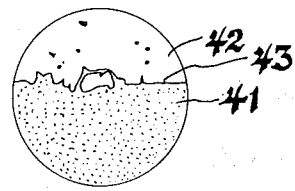
Figure 6 is a fragmentary showing based on a photomicrograph taken of a bond between steel and copper produced in the apparatus.

In order to produce a billet wherein copper or copper alloy is bonded to steel or other ferrous material with a substantially indestructible bond exhibiting what has been described as atomic adhesion, utilization is made of a suitable crucible 37 placed within the retort 27, such crucible suitably positioning the core of ferrous metal at a point intermediate the strips of copper or copper alloy which are to be bonded to such core. After the temperature has reached or passed above the point of 1832 degrees Fahrenheit and has reached a point intermediate the melting point and boiling point of the copper or copper alloy, an oxygen-free copper steel line of union will be produced, such bond exhibiting the characteristics shown in Figure 6, wherein the copper 41 penetrates into and around the areas of the steel particles forming the practically indestructible bond with the steel 42 along the line 43 at which juncture what has been termed atomic adhesion between the copper and the steel takes place.

While the use of the gas mixture produced within the apparatus is of particular utility in forming copper-clad material which may be utilized directly or subjected to various rolling and fabricating processes, such gaseous mixture has many other uses and may be placed in containers for subsequent use or may be transported through suitable piping to other equipment designed to bring about certain predetermined results.

The gases treated in the gas production unit may be drawn off separately, if desired, and used where a gas produced from the fuel gas supply having a high percentage of hydrogen content is required, or on the other hand where a gas produced from the air supply and having a large percentage of nitrogen along with carbon monoxide is required. However, the combination of the gases produced from the fuel gas supply and the air supply have been established as being particularly suited to the treatment of ferrous metals including those of high carbon content as well as associated with various alloys. It is desirable, however, for certain types of ferrous metals to greatly reduce the amount of hydrogen content of the gases to prevent decarburizing effects on the steel. It likewise is necessary to so proportion the gases to avoid having an excess of nitrogen bring about nitriding reaction on the steel. With a temperature always in excess of 1000 degrees centigrade or 1832 degrees Fahrenheit, no carbon dioxide will be present in the gaseous mixture, but should such temperature be permitted to drop and a considerable percentage of carbon dioxide be present in the gases, a carburizing effect upon the metal undergoing treatment might be brought about.

By using substantially equal volumes of fuel gas supply and air supply, a balanced mixture of the treated gases will be provided, wherein the quantities of hydrogen, carbon monoxide, and nitrogen will be substantially equal in amount. The apparatus illustrated and described herein is provided with means for controlling the amount of fuel gas supply and air supply utilized in the apparatus, so that any desired proportioning of the constituent elements may be brought about. This permits the use of a wide variety of fuel gas or hydrocarbon gas supplies in conjunction with various proportions of air to condition the gas for any desired character of use.

The principal source of fuel gas is natural gas and city illuminating gas which are very inexpensive and which have a low proportion of carbon dioxide and impurities. Such gas, after treatment over the preconditioned coke at a temperature at or above 1832 degrees Fahrenheit within the apparatus above described, becomes stabilized, with a high percentage of hydrogen from approximately 75 to 85 per cent, with a carbon monoxide percentage of from 5 to 10 per cent, and a nitrogen content of from approximately 5 to 10 per cent. After this treated fuel gas supply is intermixed with the products of the treated air supply, the amounts of hydrogen, carbon monoxide, and nitrogen are approximately equal, ranging substantially between 30 and 35 per cent, and being wholly free of carbon dioxide and water vapor. The high percentage of nitrogen in the mixture reduces the explosion hazard to a negligible factor, and the carbon monoxide present is in such concentration as to produce excellent results without danger of producing any decarburizing effects on the ferrous metal under treatment.

The preconditioned coke used in the apparatus acts in the manner of a catalyst and exhibits no physical change over an extended period of use, its weight remaining substantially unchanged. Such coke must be of substantially uniform dependable quality throughout, being free of all volatile constituents, such as hydrogen, oxygen, and hydrocarbons and oxides. It should be supplied in the form of large granular clusters or lumps so as to afford ample contact areas for the gases passing through the retorts. The coke when produced should be heated to a very high temperature, approximately to 2462 degrees Fahrenheit, so as to insure the complete removal of all traces of resinous matter and other volatile constituents.

With coke of the character referred to, it will effectively remove all the moisture from the gases passing thereover at temperatures of not less than 1832 degrees Fahrenheit, and will stabilize such gases so that they will exert neither an oxidizing nor a decarburizing effect on ferrous metals brought into contact therewith. Through the repeated use of the preconditioned carbon masses within the retorts, the coke will ultimately be reduced in size and become less porous, and its replacement by fresh supplies of preconditioned coke will be required to maintain the apparatus at its highest efficiency.

The position of the retorts in the gas production unit is shown in Figure 3 of the drawings, and the manner in which the preconditioned coke is inserted within such retorts is described in Figure 4. Each of the retorts is part of a circulating and recirculating system shown in Figures 1 and 2, and more particularly in the diagrammatic views comprised in Figures 7 to 10.

As shown more particularly in said last-named views, the air supply for the apparatus is received through the pipe 51 and the gas supply through the pipe 52. A four-way valve 53 provides for the flow of the air supply to the four-way valve 54 through the pipe 55 when positioned as shown in Figures 7 and 8. When turned through an angle of 90 degrees, the four-way valve 53 will connect the fuel gas supply in the pipe 52 with the four-way valve 54 through the pipe 55, as shown more particularly in Figures 9 and 10. In the first position of adjustment, the fuel gas supply will be connected with the four-way valve 56 at the opposite end of the gas production unit, from the valve 54, through the pipe 57, as shown in Figures 7 and 8, and in the second position will connect the air supply 51 with the four-way valve 56 through the pipe 57, as shown in Figures 9 and 10. The actuation of the four-way valve 53 may be brought about by manual means or by other operating means such as the solenoid 58 shown in Figures 7 to 10, which may be controlled by an automatic clock mechanism 59. The valve 53 thus provides for changing the direction of flow of the air and gas supplies through the conduits and retorts of the gas production unit.

In addition to this change of direction, the gas supplies undergoing treatment may be directed through the retorts in various combinations through the operation of the valves 54 and 56 which are operated in unison and may be controlled by manual means or through the use of various controlling apparatus such as the solenoid 61 connected with a shifting bar 62 operating the respective control members 63, 64 directly operating such valve, as indicated in Figures 7 to 10. The solenoid 61 may be connected with the automatic clock mechanism 59 which may be arranged to operate the valves 54 and 56 at predetermined intervals independently or in conjunction with a predetermined control for the valve 53 in conjunction therewith. The valve 53 likewise may be independently operated at predetermined intervals. The rate of flow and response of the gases to the changed paths of travel through the gas production unit occurs with substantially no interruption in the uniformity of the products of the gas treatment of the respective fuel gas supply and air supply, inasmuch as the diminution of one character of gas in any of the retorts under use is compensated for by an increase in the amount of such gas supplied through the companion retorts wherein changes are made in like proportion to the other gas supply.

When the respective valves are arranged in the manner shown in Figure 7, after the apparatus has been brought up to temperature ready for gas production, the air supply will travel through the pipes or conduits 51, through the valve 53 into the pipe 55, through the valve 54 into the connection 65 into the retort 8, into the connection 66 through the valve 56 into the retort 10, and thence through the connection 67 to the outlet conduit 24, whence it may be carried to the point of storage 25 or to the retort 27, as heretofore described. Thus there will be air in pipe 51, air mixed with cracked gas previously passing in the opposite direction in pipes and retorts 55, 65, 8, 66, 10 and 67. The fuel gas supply in Figure 7 enters through the pipe or conduit 52, passes through the valve 53 into the pipe 57 to the valve 56, wherein it is carried through the connection 71 to the retort 11, and through the connection 72 through the valve 54 to the retort 9, and thence through the pipe 73 to the outlet conduit 24, where it is combined with the products of the treatment of the air supply, as just described. Thus the fuel gas will drive ahead of it and mix with air and gas under treatment at advanced stages in pipes and retorts 57, 11, 72, 9 and 73. The pipes 67 and 73 supply the final treated product through the outlet conduit 24.

When the valve 53 is turned through a ninety degree angle to the position shown in Figure 9, the treatment of the fuel gas supply takes place within the retorts 8 and 10, and the treatment of the air supply in the retorts 11 and 9 through the associated pipes and conduits as above explained, the valves 54 and 56 remaining in their original positions, as shown in Figures 7 and 8. This substitution or interchange of the fuel gas supply and air supply within the respective pairs of retorts, with the direction of flow within such retorts the same, permits the fuel gas to react with the coke from which the deposited carbon has been removed by the air supply at high temperature, and permits the air supply to react with the freshly deposited carbon in the retorts into which it now has been directed, to take up such carbon, and recondition the coke for further reaction with the fuel gas in the alternate cycle of operations. Since the newly admitted air or gas enters the pipes and retorts alternately and in different directions, cracking and mixing occur in stages. Since the passage of gas or air, or mixtures thereof, is from one side or the opposite side, there is a double heating of the gases in the inner and outer retorts of each of the parallel or alternate systems. Thus the gas emerges from the heat of one retort and is turned back through a second retort in the furnace chamber, thus providing a continuous dual system.

When the valve 53 is in its original position as shown in Figures 7 and 8, the direction of the flow of the air supply will be the same up to the valve 54, but if the pairs of valves 54 and 56 have been moved in unison through a ninety degree angle, the air supply will be carried through the valve 54, into the connection 72, retort 11, connection 71, retort 10, and connection 67 into the conduit outlet 24. The fuel gas supply under such positioning of the end valves 54 and 56, will pass from the valve 56 into the connection 66, retort 8, connection 65, retort 9, and connection 73, to the outlet conduit 24.

When the valve 53 is turned to an angle of ninety degrees to a position similar to that shown in Figure 9, and when the end valves 54 and 56 are retained in the position shown in Figure 8, then the retorts and conduits will be connected as shown in Figure 10, and the flow of air and gas through the respective retorts will be substituted or interchanged relative to the showing in Figure 8 within the respective pairs of retorts, with the direction of flow within such retorts the same, the air in such instance passing through the valve 53, conduit 57, valve 56, connection 66, retort 8, connection 65, retort 9, pipe connection 73, to the outlet conduit 24, and the fuel gas passing through the valve 53, pipe 55, valve 54, connection 72, retort 11, connection 71, retort 10, pipe connection 67, to the outlet conduit 24.

Thus through the control of the valves and the various adjustments shown in Figures 7 to 10, the flow of air and gas may take place in either direction through the outer retorts 8 and 11, which are the retorts first entered by the several gases and within which the heavier carbon coatings are formed on and removed from the preconditioned coke. The inner retorts serve to stabilize the gases through recirculation before they are combined in the outer conduit 24.

As shown more particularly in Figures 1 and 2, the pipe connections are provided with petcocks 74 and cut-off valves 75, such petcocks permitting gas to be withdrawn from the conduits at various points to note the contents as indicated by the character of flame, and the valves 75 serving with the unions 18 heretofore described to permit the shutting down of various passageways to permit replacement of parts without shutting off the entire apparatus. The valves 76, 77 shown in Figure 2 permit accurate control of the proportions of air and fuel gas admitted to the various retorts and thus serve to control the proportioning of the gas elements after the treatment of such original gases.

Figure 11:
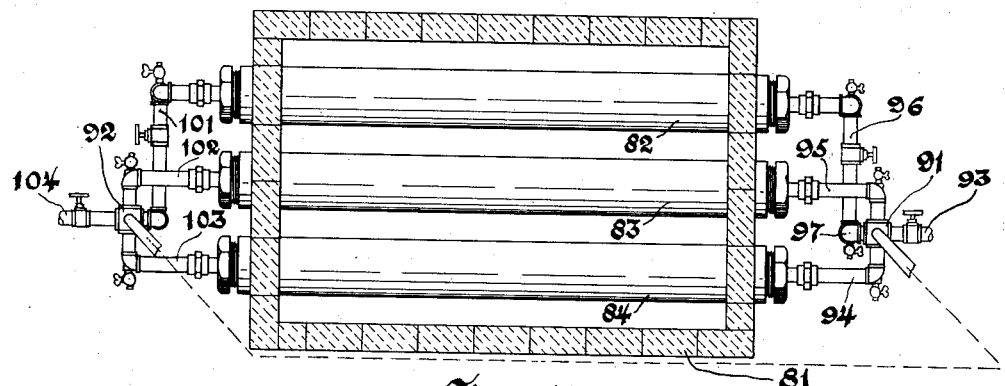
Figure 11 is an enlarged plan view, partly in section, showing a heating chamber provided with three retorts together with the gas passageways and valve members associated therewith.
Figure 12:
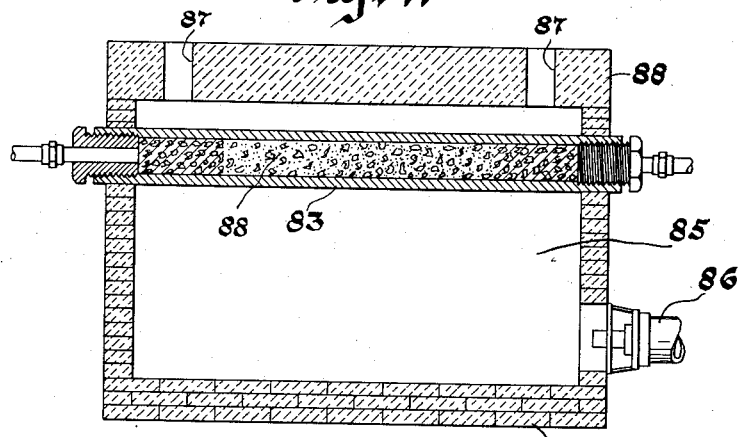
Figure 12 is a central vertical sectional view of the heating chamber shown in Figure 11.
Figure 13:
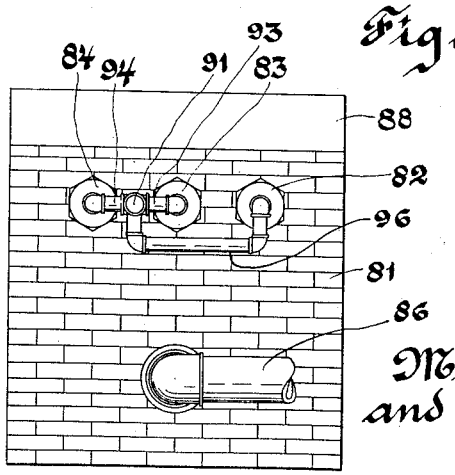
Figure 13 is an end view of the structure shown in Figure 11.

In addition to the preferred form of construction hereinabove described, the recirculation of the air supply may be dispensed with, and three retorts utilized in the gas producing unit in place of four retorts as originally stated. This modified form of construction is illustrated in Figures 11 to 13, wherein the gas producing unit 81 is provided with three retorts 82, 83, 84. A heating chamber 85 is provided beneath the retorts and a forced draft burner 86 supplies a high temperature, the spent gases escaping through the openings 87 in the top plate 88. The retorts are filled with preconditioned coke 89 in an identical manner with the retorts shown in Figure 4. Four-way valves 91, 92 are provided at each end of the apparatus, the valve 91 being connected with the fuel gas supply conduit 93, and having pipe connections 94, 95, 96, whereby such fuel gas may be directed selectively into the retorts 82 or 84, in each instance being recirculated through the retort 83 and emerging through the connection 95, four-way valve 91 and outlet conduit 97. The four-way valve 92 provides passageways 101, 102, 103, through which the air supply received through the conduit 104 may be directed into either of the retorts 82 and 84, and whereby the alternate retort may be connected for the recirculation of the fuel gas supply through the central retort 83.

The apparatus just described has not the smooth uniformity of performance of the preferred type of structure, but under certain conditions of specialized use of the apparatus will prove serviceable, particularly where only intermittent use is in view.

Various other combinations of gas production and gas treatment units may be provided along the lines of those illustrated, such forms of construction being in no manner exhaustive of the possible combinations available for use with the process set forth. The preferred type of structure, as has been stated, provides unusual economies of operation and dispenses with auxiliary equipment heretofore deemed essential to the production of a dry non-oxidizing gas having neither carburizing nor decarburizing effects and being fully stabilized and free of explosion hazards.

Other modes of applying the principle of our invention may be employed instead of those explained, change being made as regards the means and steps herein disclosed, provided the means stated by any of the following claims or the equivalent of such stated means be employed.

We therefore particularly point out and distinctly claim as our invention:

1. A method for producing non-oxidizing gases which comprises passing a hydrocarbon gas in contact with a charge of non-resinous coke preconditioned by previous air treatment, heated to a temperature of not less than 1832° F., simultaneously passing air in contact with a second and separated charge of coke heated to a temperature of 1832° F. and on which carbon has been deposited by the decomposition in a previous passage of hydrocarbon gas, conditions being so fixed that the carbon of the second charge is combusted without substantial oxidation of the coke, and that the hydrocarbon gas is decomposed with deposition of carbon on the first charge, combining the outlet gases from the charges and then reversing the flow of gases so that hydrocarbon gas passes in contact with the second charge and air in contact with the first charge.

2. The method of the preceding claim in which the cycle is continuously repeated and the gases as combined are continuously passed immediately after combination into contact with superposed bodies of metals to be bonded, whereby the contact surface of the top body will merge in a bond of atomic adhesion with the contact surface of the lower body.

MAHLON J. RENTSCHLER.
BENJAMIN P. B. TEST.